(12) United States Patent
Prabakaran (10) Patent No.: US 9,001,160 B2
(45) Date of Patent: Apr. 7, 2015

(54) FRAME TIMING SYNCHRONIZATION FOR AN INLINE SCALER USING MULTIPLE BUFFER THRESHOLDS

(75) Inventor: Vijay G. Prabakaran, San Jose, CA (US)

(73) Assignee: Apple Inc., Cupertino, CA (US)

( * ) Notice: Subject to any disclaimer, the term of this patent is extended or adjusted under 35 U.S.C. 154(b) by 309 days.

(21) Appl. No.: 13/602,848

(22) Filed: Sep. 4, 2012

(65) Prior Publication Data

US 2014/0063069 A1 Mar. 6, 2014

(51) Int. Cl.
 *G09G 5/02* (2006.01)
 *G09G 5/00* (2006.01)
 *G06T 3/40* (2006.01)

(52) U.S. Cl.
 CPC ... *G09G 5/00* (2013.01); *G06T 3/40* (2013.01)

(58) Field of Classification Search
 None
 See application file for complete search history.

(56) References Cited

U.S. PATENT DOCUMENTS

| | | | |
|---|---|---|---|
| 5,832,115 | A | 11/1998 | Rosenberg |
| 7,643,066 | B2 | 1/2010 | Henninger, III et al. |
| 8,049,691 | B2 | 11/2011 | Pan et al. |
| 2012/0081578 | A1 | 4/2012 | Cote et al. |

*Primary Examiner* — Mark Zimmerman
*Assistant Examiner* — Vu Nguyen
(74) *Attorney, Agent, or Firm* — Anthony M. Petro; Meyertons, Hood, Kivlin, Kowert & Goetzel, P.C.

(57) ABSTRACT

During downscaling of an image, a scaler may generate a specified number 'M' output lines of an output frame for each specified number 'N' input lines of an input frame, and store the output lines in a buffer. The scaler may keep the output horizontal line durations consistent throughout the active line period, with a horizontal line duration ratio of M/N between input and output frame streams. 'M' threshold values may be stored in a lookup table, and for each output line the relative position of the output line within the output frame may be used to look up a corresponding threshold value in the lookup table, and the timing generator may wait until the buffer occupancy reaches the corresponding threshold value before outputting the output line from the buffer. To guarantee even line widths, the threshold values may be assigned values that depend on the scaling ratio used.

10 Claims, 8 Drawing Sheets

FRAME TIMING SYNCHRONIZATION FOR AN INLINE SCALER USING MULTIPLE BUFFER THRESHOLDS

BACKGROUND

1. Field of the Invention

This invention is related to the field of graphical information processing, more particularly, to frame timing synchronization.

2. Description of the Related Art

Part of the operation of many computer systems, including portable digital devices such as mobile phones, notebook computers and the like is the use of some type of display device, such as a liquid crystal display (LCD), to display images, video information/streams, and data. Accordingly, these systems typically incorporate functionality for generating images and data, including video information, which are subsequently output to the display device. Such devices typically include video graphics circuitry to process images and video information for subsequent display.

In digital imaging, the smallest item of information in an image is called a "picture element", more generally referred to as a "pixel". For convenience, pixels are generally arranged in a regular two-dimensional grid. By using this arrangement, many common operations can be implemented by uniformly applying the same operation to each pixel independently. Since each pixel is an elemental part of a digital image, a greater number of pixels can provide a more accurate representation of the digital image. The intensity of each pixel can vary, and in color systems each pixel has typically three or four components such as red, green, blue, and black.

Most images and video information displayed on display devices such as LCD screens are interpreted as a succession of image frames, or frames for short. While generally a frame is one of the many still images that make up a complete moving picture or video stream, a frame can also be interpreted more broadly as simply a still image displayed on a digital (discrete, or progressive scan) display. A frame typically consists of a specified number of pixels according to the resolution of the image/video frame. Information associated with a frame typically consists of color values for every pixel to be displayed on the screen. Color values are commonly stored in 1-bit monochrome, 4-bit palletized, 8-bit palletized, 16-bit high color and 24-bit true color formats. An additional alpha channel is oftentimes used to retain information about pixel transparency. The color values can represent information corresponding to any one of a number of color spaces.

In certain situations, video images, or pixel streams provided to a display panel or display interface might have a different resolution than what the display is capable of supporting. Conversely, the display might have a higher native resolution (number of horizontal pixels per number of vertical pixels) than the video images to be displayed. Oftentimes, in order to properly display various images of differing resolution on the same display, a video scaler is used. Typically, video scalers operate to convert video signals from one size or resolution to another, and can be incorporated into computer monitors, scan conversion devices, televisions, video editing and broadcasting equipment, and other audio/visual devices. In any case, there are many different types of video signals and video displays with different respective resolutions, which oftentimes necessitates some form of resolution adaptation, or video scaling, to properly frame a video signal to the display device. Because of the change in the number of pixels per frame from source to destination during a scaling operation, the flow of the pixel data from the source has to be changed with respect to the destination. The effective data rate change between the input frame and the output frame creates a need to retime the pixel stream, which can cause issues in the downstream logic, especially when providing the pixel stream to a third party display interface.

Other corresponding issues related to the prior art will become apparent to one skilled in the art after comparing such prior art with the present invention as described herein.

SUMMARY

In a graphics display pipe/system, certain processing blocks, like a scaler block, may perform operations that can cause the data rate to change between the input frame and the output frame. The upstream logic (source, or input) may transmit data to the scaler, with timing that is required by a display panel (destination, or output), with properly defined blanking intervals. The downstream logic from the scaler may also expect data to be transmitted in this manner. Hence, the upstream logic may not be backpressured, and the pixel transmission to the downstream logic may not contain any bubbles. This creates the need for buffering and retiming the signal to the downstream logic without applying any backpressure to the upstream logic. The buffering and retiming typically results in the Scaler sending output data in an uneven manner depending on the scale ratio during downscaling, which may result in issues downstream. Hence, it is desirable to reduce the uneven nature of the output frame stream.

When performing downscaling, the input data rate into the scaler may be guaranteed, and the nature of the data flow out of the scaler may be predicted. If the scaler generates a specified number 'M' output lines for each specified number 'N' input lines, when output horizontal line durations are kept consistent throughout the active line period, the ratio of horizontal line duration between input and output frame streams is M/N. In this sense, the horizontal line duration refers to the actual time duration of a valid burst, that is, the length of the time period during which a given line is considered active. Since the ratio between the input pixel clock domain and the output (scaled) pixel clock domain is approximately $(N/M)^2$, (potentially somewhat less, when accounting for vertical and horizontal blanks, which are not scaled according to the scaling ratio), and the input to output horizontal resolution ratio is N/M, the input to output line duration has ratio of M/N. Hence, after every output line the FIFO has residual data corresponding to the next line left over, and which equals HresOut*(N−M)/N. The FIFO occupancy keeps increasing by this number until an input line is skipped, at which point the FIFO occupancy falls back to zero.

A lookup table may be used to store 'M' (number of) FIFO thresholds. For each output line, the number obtained by "Line Number Modulus M" may be used to index into the lookup table, and the timing generator may wait until the FIFO occupancy reaches the corresponding threshold value obtained from the lookup table, before beginning to transmit the output line. To guarantee even line widths, the FIFO thresholds may be programmed with values that depend on the scaling ratio used. If the input and output pixel clocks are the same, a specified value may be added to the threshold to ensure that no bubbles are present in the pixel stream during a scan line.

Accordingly, in one set of embodiments, a frame timing controller may include a lookup table storing a specific number of threshold values, and a processing unit coupled to the lookup table to determine timing of the output lines in each output frame according to the threshold values. Thus, for each respective line of a scaled image frame, the processing unit may determine an index number from a relative position of the respective line in the scaled image frame, and a scaling factor corresponding to a scaling ratio used to obtain the line of the scaled image frame from corresponding lines of an input image frame. The processing unit may then obtain a stored threshold value from the lookup table according to the index number, wait until occupancy of the buffer that stores the respective line of the scaled image frame reaches a value corresponding to the stored threshold value, and once the occupancy of the output buffer reaches the value corresponding to the stored threshold value, output the respective line of the scaled image frame from the buffer.

In some embodiments, the number of different stored threshold values is commensurate with the scaling factor, and that number may be stored in a register. Furthermore, the threshold values may be specified according the scaling ratio and the horizontal resolution of the scaled image frame. The processing unit may also generate frame timing signals corresponding to the scaled image frame, and output the respective line of the scaled image frame according to the generated frame timing signals.

In one embodiment, a graphics system includes a display generation unit that generates image frames having a resolution of horizontal pixels per vertical pixels (HVP), with each image frame represented as a specified number of lines, and provides the image frames as a data stream for display. A scaler unit in the graphics system may receive the data stream, obtain a scaled data stream by scaling the received data stream according to a scaling ratio, (where the scaled data stream is represented as scaled image frames, and each scaled image frame is represented as scaled lines), and generate evenly spaced output pixel valid pulses according to the scaling ratio. The scaler unit may sequentially output the scaled lines by outputting each subsequent scaled line on a corresponding subsequent output pixel valid pulse.

The graphics system may include a buffer that stores the scaled lines, and the scaler unit may sequentially output the scaled lines from the output buffer. The graphics system may also include a threshold lookup table that stores a specified number of threshold values determined according to the scaling ratio, and the scaler unit may generate the output pixel valid pulses according to the stored threshold values. In one embodiment, the scaler unit generates each subsequent output pixel valid pulse responsive to receiving an indication from the buffer that occupancy of the buffer has reached a value corresponding to one of the specified number of threshold values.

In one embodiment, a scaler includes a scaler block that receives an input pixel stream representative of input frames constructed of input lines, scales the received input pixel stream according to a specified scaling ratio to generate an output pixel stream representative of corresponding output frames constructed of output lines, and stores the output lines in an output buffer. The scaler also includes an output timing generator that outputs the next stored output line from the output buffer each time an occupancy of the output buffer reaches a value corresponding to one of a number (M) of different specified threshold values, where the next stored output line corresponds to the threshold value to which the value reached by the occupancy of the output buffer also corresponds, and M is a scaling factor corresponding to the specified scaling ratio. The output timing generator receives the occupancy value of the output buffer from the output buffer, compares that received occupancy value with the threshold value, and outputs the next stored output line from the output buffer responsive to the received occupancy value of the output buffer reaching the identified threshold value. The timing generator block may identify the threshold value based on a relative position of the next stored output line within the output frame.

BRIEF DESCRIPTION OF THE DRAWINGS

The following detailed description makes reference to the accompanying drawings, which are now briefly described.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

Various units, circuits, or other components may be described as "configured to" perform a task or tasks. In such contexts, "configured to" is a broad recitation of structure generally meaning "having circuitry that" performs the task or tasks during operation. As such, the unit/circuit/component can be configured to perform the task even when the unit/circuit/component is not currently on. In general, the circuitry that forms the structure corresponding to "configured to" may include hardware circuits and/or memory storing program instructions executable to implement the operation. The memory can include volatile memory such as static or dynamic random access memory and/or nonvolatile memory such as optical or magnetic disk storage, flash memory, programmable read-only memories, etc. Similarly, various units/circuits/components may be described as performing a task or tasks, for convenience in the description. Such descriptions should be interpreted as including the phrase "configured to." Reciting a unit/circuit/component that is configured to perform one or more tasks is expressly intended not to invoke 35 U.S.C. §112, paragraph six interpretation for that unit/circuit/component.

DETAILED DESCRIPTION OF EMBODIMENTS

Various embodiments described herein are directed to generating frame timing for a pixel stream obtained by passing the active pixel content of a frame through an inline pixel-processing block (e.g. in a display pipe) that changes the flow of the data. One example of an inline pixel-processing block (IPPB) that changes the flow of the pixel data is a scaler. While the various embodiments described in detail are in the context of a scaler, the frame timing may equally be applied to any pixel stream for which the nature of the data flow change can be calculated or obtained beforehand.

As used herein, "upstream logic" (UL) refers to the block (e.g. in a display pipe) that sends/transmits data to the pixel-processing block that changes the data flow (such as a scaler). "Downstream logic" (DL) refers to any block that receives/consumes the data from the output of the pixel-processing block that changes the data flow, that is, the data from the output of the IPPB. Hsync refers to the horizontal synchronization (or sync) signal that is asserted after a horizontal front porch interval that follows the last pixel data in the previous line, and is deasserted after Hsync duration. Horizontal Back Porch refers to the time interval between the deassertion of the Hsync signal and the start of pixel data. Vsync refers to the vertical synchronization signal that is asserted after a vertical front porch interval following the last pixel data in the last line of a frame. It serves as the boundary between two frames. Various embodiments discussed herein assume rational scaling ratios expressed as a ratio of two integers M/N, but alternate embodiment may easily be extended to other scaling ratios not expressed as a ratio of two integers.

DDA refers to "digital difference analyzer," which, in the case of vertical scaling, keeps track of the input line position depending on the output line. The input line position may be a fraction calculated by incrementing the DDA by a specified step amount referred to as "DDAstep", which may be the equivalent of 1/scaling ratio, for every output line. The same logic may apply to pixels within a line for horizontal scaling. An Active Line Period refers to the time interval during which pixel data is transmitted, and includes the horizontal blanking period. HresOut refers to the Horizontal Resolution of the output image, and VresOut refers to the Vertical Resolution of the output image.

Figure 1:
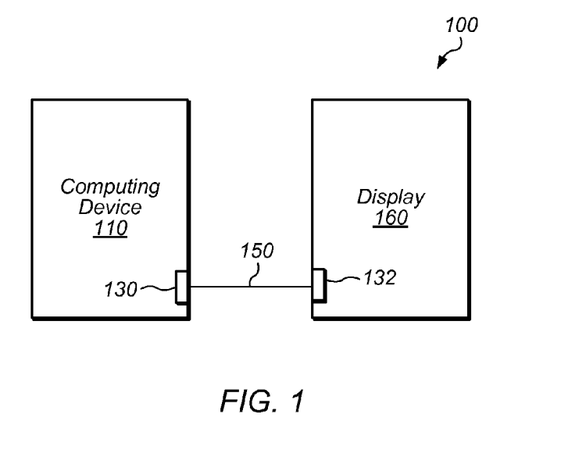
FIG. 1 shows a partial block diagram of one embodiment of a computer system that includes a computing device driving a graphics display.

FIG. 1 shows a block diagram of one embodiment of a computer system in which a computing device provides pixels for displaying on a display. Computer system 100 includes computing device 110, which may be any suitable type of computing device. In one embodiment, device 110 is a tablet computing device such as an iPad™ product.

As shown in FIG. 1, device 110 is coupled to display (panel) 160 via display port connection 150. As used herein, a display, display panel, or graphics display refers to any device that is configured to present a visual image in response to control signals to the display. A variety of technologies may be used in the display, such as cathode ray tube (CRT), thin film transistor (TFT), liquid crystal display (LCD), light emitting diode (LED), plasma, etc. A display may also include touch screen input functionality, in some embodiments. The display devices may also be referred to as panels, in some cases.

Computing device 110 includes an external interface 130 to couple to external display 160 via connection 150. Similarly, display 160 may contain a panel driver interface 132 to receive the information from computing device 110 for displaying on display panel 160. Interface 130 may be any type of standard or proprietary interface, and may be wired or wireless. A given interface 130 can be understood to have a "data width" (e.g., a number of pins) dedicated to a specified amount of data the interface can transfer at a given point in time. Specifically, interface 130 may have a specified number of lines dedicated to transferring graphics (e.g. video/image) information to external display 160. Interface 130 may also be configured to provide data to other types of external devices that may also be coupled to computing device 110 via interface 130, in lieu of or in addition to external display 160. Connection 150 is a logical representation of the connection between device 110 and display 160. In various embodiments, connection 150 may be wireless. In other embodiments, connection 150 may be wired, and may include one or more intervening hardware components, such as a scaling unit or timing controller chip that will be further discussed below. In one embodiment, display 160 is a high-definition TV (HDTV) compatible device.

Computing device 110 may include various structures (not depicted in FIG. 1) that are common to many computing devices. These structures include one or more processors, memories, graphics circuitry, I/O devices, bus controllers, etc. Processors within device 110 may implement any instruction set architecture, and may be configured to execute instructions defined in that instruction set architecture. The processors may employ any microarchitecture, including scalar, superscalar, pipelined, superpipelined, out of order, in order, speculative, non-speculative, etc., or combinations thereof. The processors may include circuitry, and optionally may implement microcoding techniques. The processors may include one or more L1 caches, as well one or more additional levels of cache between the processors and one or more memory controllers. Other embodiments may include multiple levels of caches in the processors, and still other embodiments may not include any caches between the processors and the memory controllers.

Memory controllers within device 110 may comprise any circuitry configured to interface to the various memory requestors (e.g. processors, graphics circuitry, etc.). Any sort of interconnect may be supported for such memory controllers. For example, a shared bus (or buses) may be used, or point-to-point interconnects may be used. Hierarchical connection of local interconnects to a global interconnect to the memory controller may be used. In one implementation, a memory controller may be multi-ported, with processors having a dedicated port, graphics circuitry having another dedicated port, etc.

Alternatively, the devices may be mounted with a system on a chip in a chip-on-chip configuration, a package-on-package configuration, or a multi-chip module configuration. Graphics controllers within device 110 may be configured to render objects to be displayed into a frame buffer in the memory. The graphics controller may include one or more graphics processors that may execute graphics software to perform a part or all of the graphics operation, and/or hardware acceleration of certain graphics operations. The amount of hardware acceleration and software implementation may vary from embodiment to embodiment.

Figure 2:
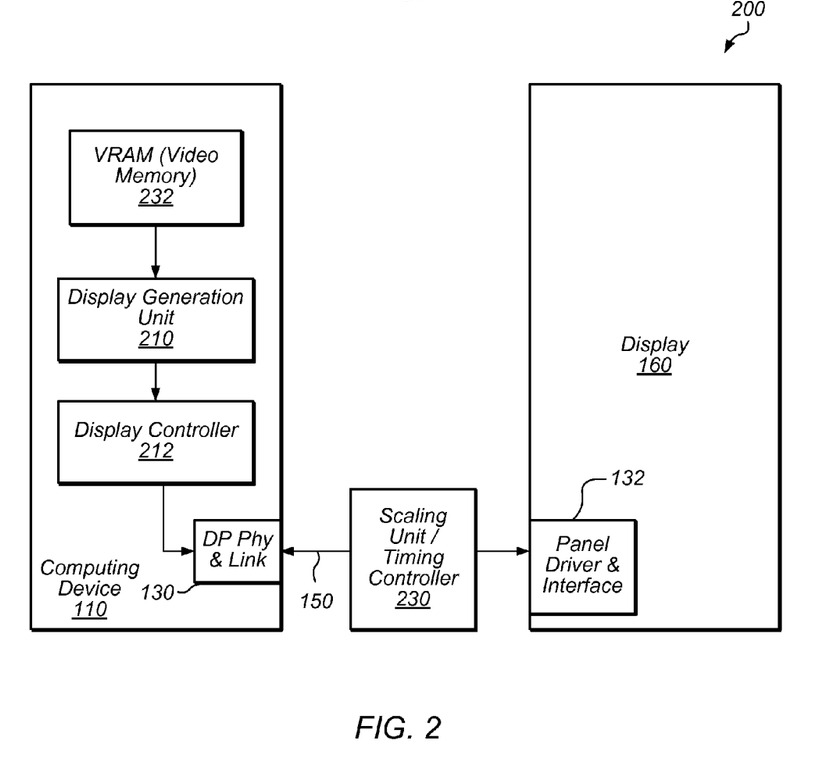
FIG. 2 shows a more detailed partial block diagram of one embodiment of a computer system that includes a computing device driving a graphics display through a scaling unit/timing controller.

Referring now to FIG. 2, a more detailed partial block diagram of the system of FIG. 1 is shown. In addition, system 200 also includes a scaler/timing controller unit situated in-between computing device 110 and display 160. Computing device 110 may include a display generation unit 210 which may generate the pixels to be displayed on display 160. Display generation unit 210 may receive video and/or image information from memory elements 232, which store the video frames/information and image frame information, to provide that information (e.g. pixels) to display generation unit 210 as required. Memory 232 may be any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices may be coupled onto a circuit board to form memory modules such as single inline memory modules (SIMMs), dual inline memory modules (DIMMs), etc.

In some embodiments, the video frames/information may be represented in a first color space, according the origin of the video information. For example, the video information may be represented in the YCbCr color space. At the same time, the image frame information may be represented in the same color space, or in another, second color space, according to the preferred operating mode of the graphics processors. For example, the image frame information may be represented in the RGB color space. Display generation unit 210 may include components that blend the processed image frame information and processed video image information to generate output frames that may be stored in a buffer, from which they may be provided to a display controller 212, which may provide the output pixel stream to display port (physical layer and link) 130 to be sent out over connection 150.

In one set of embodiments, the output frames may be presented to the display controller 212 through an asynchronous FIFO (First-In-First-Out) buffer in display generation unit 210. The display controller may control the timing of the display through a Vertical Blanking Interval (VBI) signal that may be activated at the beginning of each vertical blanking interval. This signal may cause the graphics processor(s) to initialize (Restart) and start (Go) the processing for a frame (more specifically, for the pixels within the frame). Between initializing and starting, configuration parameters unique to that frame may be modified. Any parameters not modified may retain their value from the previous frame. As the pixels are processed and put into the output FIFO, the display controller may issue signals (referred to as pop signals) to remove the pixels at the display controller's clock frequency. The pixels thus obtained may be queued up in the output FIFO at the clock rate of the processing elements within display generation unit 210, and fetched by the display controller at the display controller's clock rate.

Computing device 110 may operate to display frames of data. Generally, a frame is data describing an image to be displayed. As mentioned above, a frame may include pixel data describing the pixels included in the frame (e.g. in terms of various color spaces, such as RGB or YCbCr), and may also include metadata such as an alpha value for blending. Static frames may be frames that are not part of a video sequence. Alternatively, video frames may be frames in a video sequence. Each frame in the video sequence may be displayed after the preceding frame, at a rate specified for the video sequence (e.g. 15-30 frames a second). Video frames may also be complete images, or may be compressed images that refer to other images in the sequence. If the frames are compressed, a video pipeline in device 110 may decompress the frames.

As mentioned above, a display generation unit 210 may be configured to read frame data from memory 232 and to process the frame data to provide a stream of pixel values for display. Generally, a pixel value in a stream of pixel values may be a representation of a pixel to be displayed on a display coupled to device 110, such as display 160. The pixel stream may be a series of rows of pixels, each row forming a line on the display screen. In a progressive-mode display, the lines are drawn in consecutive order and thus the next line in the pixel stream is immediately adjacent to the previous line. In an interlaced-mode display, consecutive passes over the display draw either the even or the odd lines, and thus the next line in the pixel stream skips one line from the previous line in the pixel stream. For brevity, the stream of pixel values may be referred to as a pixel stream, or a stream of pixels. Display generation unit 210 within device 110 may perform various pixel operations on the pixel stream, and eventually provide the processed pixel stream to the display port physical layer and link (DP Phy & Link) 130 via display controller 212, as mentioned above.

Oftentimes, the resolution (i.e., the number of pixels in the horizontal and vertical directions) of the image frame generated by unit 210 is different from the resolution of display 160. In order to facilitate display of images on such a display, the data sent to panel driver 132 may be downscaled/compressed. The compression means loss of image resolution, requiring a retiming of the frames before they are transmitted to panel driver 132. Scaling unit/timing controller 230 may be used retime the frames before they reach panel driver 132. It should be noted also, with reference to both FIGS. 1 and 2, that computer system 100 and computer system 200 may be designed as a single-box system in which computing device 110 and panel display 132 are a single unit, e.g. a laptop computer, or computing device 110 and panel display 132 may represent individual devices. Furthermore, in the latter case, computing device 100 may itself include an internal display as well, which may be controlled in a manner similar to what is described herein. Overall, the various separate elements in FIGS. 1 and 2 are shown for highlighting their respective functionalities as operated within the disclosed embodiments.

Horizontal vertical pixel (HVP) scaling may thus be performed by scaling unit 230, which may be part of a hardware device, e.g. an integrated circuit or chip located in the path of connection 150 as shown. In one embodiment, unit 230 may be part of a dongle that couples between interface 130 and 132, and provides a connection (either wired or wireless) to external display 160. Alternate embodiments are possible. For example, unit 230 could be situated at the other end of connection 150, or even within external display 160 or within computing device 110.

Figure 3A:
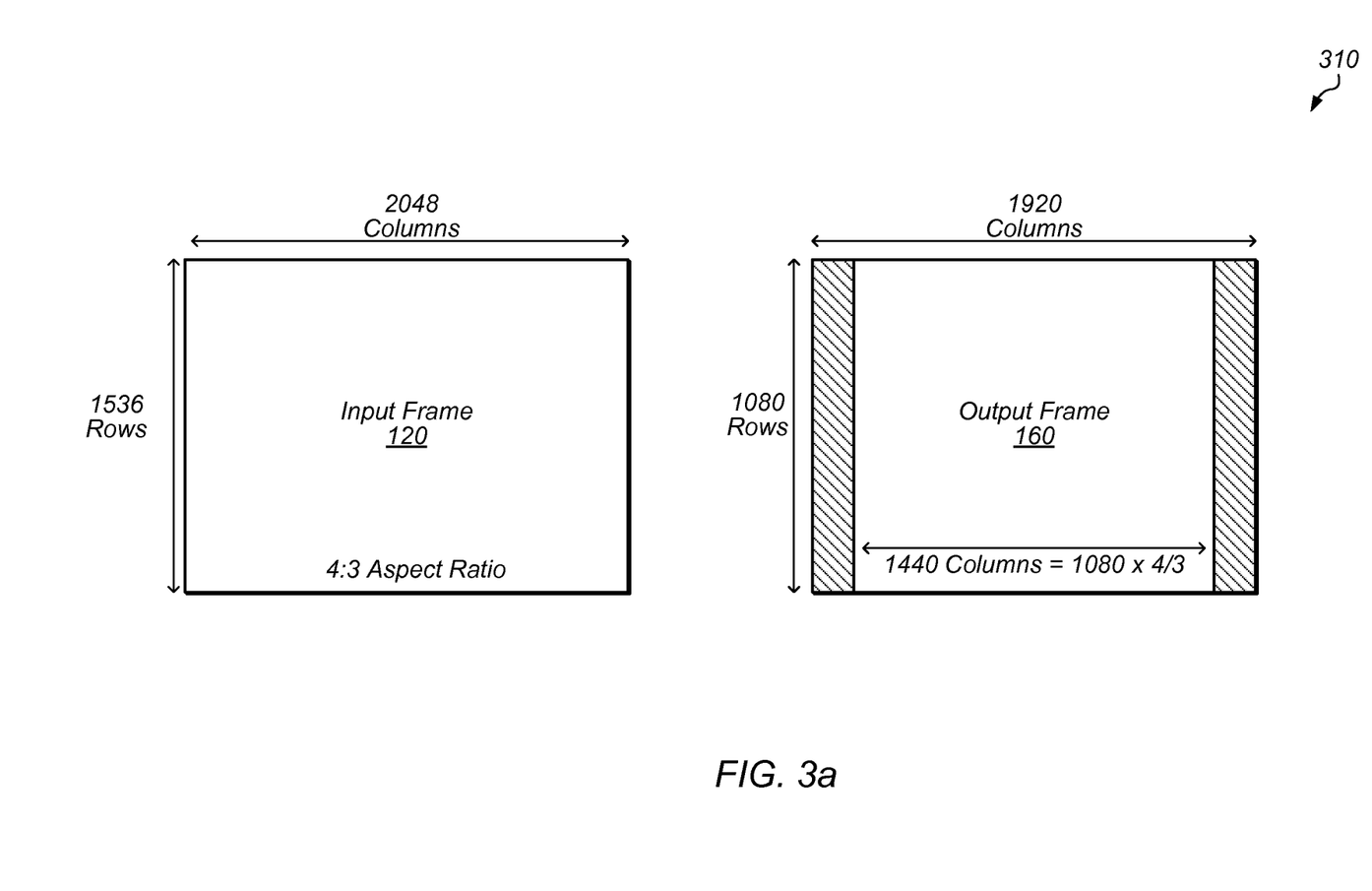
FIG. 3a illustrates an example of downscaling an image or video frame for displaying on a graphics display.
Figure 3B:
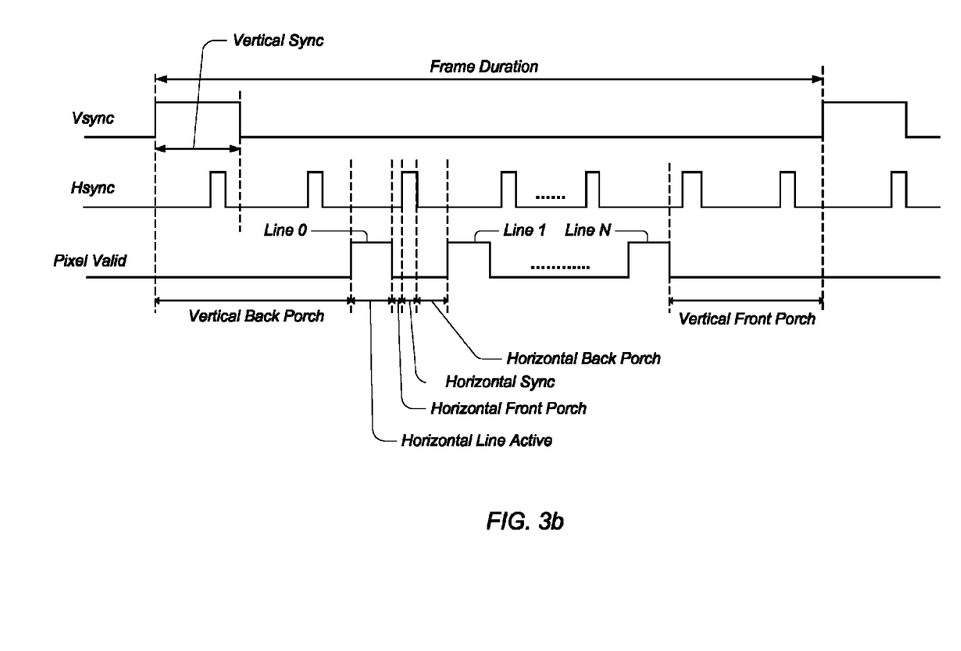
FIG. 3b shows a timing diagram illustrating the relationship between various timing signals when outputting an image frame.

FIG. 3a shows an example of scaling that may be performed by scaling unit 230. The dimensions (resolution) of the input pixel stream are shown on the left (2048 columns by 1536 rows); the dimensions of external display 160 are shown on the right (1920 columns by 1080 rows). Note that the aspect ratio (ratio of width to height) of the input stream is 4:3, while external display 160 has an aspect ratio of 16:9. Embodiments of the present disclosure may be applied to any suitable combination of input and output image frame resolutions. In the example shown, the external display 160 may be a HDTV display, such as those commonly used for presentations.

In the example shown, an image frame at 2048×1536 pixels is ultimately downscaled to fit on a 1920×1080 display, while maintaining the original aspect ratio of the image frame. In one embodiment, the scaling factor applied by unit 230 is based on whichever dimension (horizontal or vertical) needs the greatest amount of downscaling. In FIG. 3, more downscaling is needed in the vertical direction (1536 rows to 1080 rows) than in the horizontal direction (2048 columns to 1920 columns). Accordingly, the number of output columns may be computed by multiplying the number of output rows by the aspect ratio of the original image (4:3). As shown in FIG. 3, the number of output columns is 1080×(4/3)=1440. A sufficient horizontal scaling factor may therefore be applied by unit 230 to downscale 2048 columns to 1440 columns. Subsequently, a sufficient vertical scaling factor may be applied to downscale 1536 rows to 1080 rows. The resultant 1440× 1080 image preserves the original aspect ratio of 4:3. As shown, certain columns on the left and the right of the display may be unused (e.g., blacked out) and only the middle 1440 columns used. The scaling factor applied in the horizontal dimension in this example is thus based on one of the resolutions of display 160 (in this case, the vertical dimension), as well as an aspect ratio of the input image frame.

FIG. 3a shows the relationship between the important timing signals when outputting a frame composed of N lines. As seen in FIG. 3a, a Vertical Sync signal Vsync indicates the boundary between two image frames, that is, between two respective pixel streams representative of two corresponding image frames. Since the image frame is composed of image lines, specifically N image lines, timing signals are also generated to properly identify and separate the different image lines in the frame. Accordingly, following a 'Vertical Back Porch' time period (that is, a time period of specified length labeled 'Vertical Back Porch'), a horizontal synchronization (or sync) pulse Hsync ('Horizontal Sync') is asserted after a 'Horizontal Front Porch' time interval that follows the last pixel data in the previous line. Hsync is deasserted following the Hsync duration, as shown. A specified time interval labeled 'Horizontal Back Porch' is observed between the deassertion of the Hsync signal and the start of new pixel data for the next line. The vertical synchronization signal Vsync is asserted after a specified 'Vertical Front Porch' time interval following the last pixel data in the last line of a frame. The 'Horizontal Line Active" time interval represents the specified time interval during which pixel data for the given line is transmitted, and includes the horizontal blanking period.

As mentioned above, when operating a block like scaler 230, the scaling operation causes the data rate to change between the input and the output frame. The upstream logic (e.g. computing device 110) from scaler block 230 sends data with timing as required by display panel 160, with properly defined blanking intervals, and the downstream logic (e.g. panel driver 132) may also require data in this manner. Hence the upstream logic may not be backpressured, and may also not have bubbles in the pixel transmission to the downstream logic. This creates the need for a block within unit 230 to buffer and retime the signal to the downstream logic without applying any backpressure to the upstream logic. In case of downscaling, scaler block 230 may transmit output frame data in an uneven manner, stretching the horizontal back porch duration after each $M^{th}$ output line, for a scaling (scale) ratio of M/N output-lines/input-lines.

Figure 5:
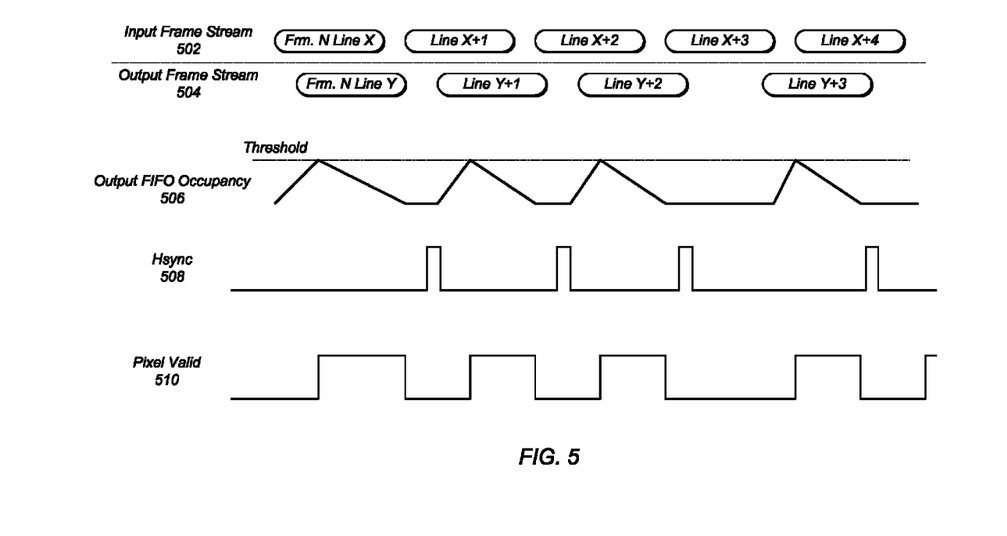
FIG. 5 shows a timing diagram illustrating burst frame-timing at the output when using a single threshold for an output buffer.

For example, for a scale ratio of 3/4, scaler 230 may generate 3 lines of data at a rate 1/4 higher than the actual output rate in a line for 3 lines, and generate no data for 1 input line period due to 2 lines being discarded at that point in time. This timing scheme is illustrated in FIG. 5. As seen in FIG. 5, lines of pixels of input frame stream 502 are used to generate an output frame stream 504 with a reduced number of lines of pixels. According to the timing scheme shown in FIG. 5, scaler 230 may wait until the data count in the output line buffer, e.g. a first-in-first-out (FIFO) buffer exceeds a certain fixed threshold, chosen to ensure that pixel data for a given line will be uninterrupted, before starting that line. In this example shown in FIG. 5, three output lines are generated per four input lines. Hence, at the end of line Y+2, the output stream waits for an extra input line, X+3, to be received before the next output line can be generated. This results in a "burst" in the output frame stream, also observed in Hsync signal 508 and pixel valid signal 510, which may cause issues downstream, especially when the pixel stream goes to a third party panel interface which may have low tolerances on the variation of the Horizontal Back Porch signal.

In an IPPB (e.g. a scaler) where the input data rate can be guaranteed, the nature of the data flow coming out of the IPPB may also be guaranteed. For example, in case of a downscaler, for a ratio of M/N (e.g. 3/4, that is, 3 output lines per 4 input lines), the DDA step is N/M (e.g. 4/3). This means that the vertical DDA skips a line once every N/(N−M) input lines in a pattern that will repeat every N input lines (or every M output lines). Given this relationship, by keeping the output horizontal line durations consistent throughout the active line period, the ratio of horizontal line duration between input and output frame streams may be maintained at M/N. Hence, after every output line, the FIFO buffer may be storing residual data left over and corresponding to the next line, and equal to HresOut*(N−M)/N. Hence the FIFO buffer occupancy may keep increasing by this number until an input line is skipped, at which point it would return to zero (0).

Thus, in one set of embodiments, a look up table may be set up to store a specified number (M) of threshold values, where each threshold value represents a FIFO threshold. For every output line, the lookup table may be indexed with the remainder obtained from dividing the line number by M. That is, the number used to index into the lookup table may be obtained as the result of the operation "Line-Number Modulus M", where "Line-Number" is representative of the relative position of the line within the frame, for example the $34^{th}$ line or $35^{th}$ line, etc. For a certain output line, the timing generator (e.g. scaler 230) may wait until the FIFO occupancy reaches the particular threshold value obtained from the lookup table, then start transmitting the horizontal line.

Figure 6:
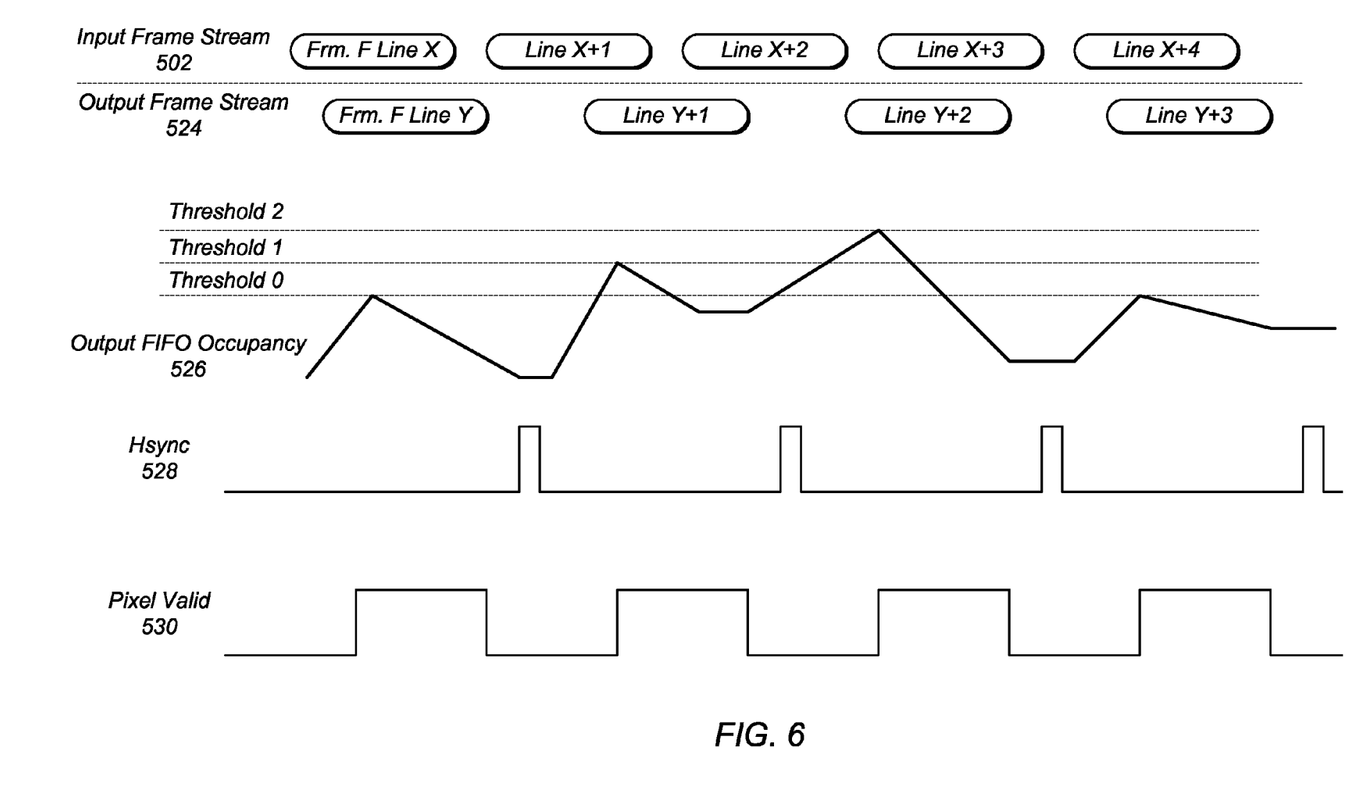
FIG. 6 shows a timing diagram illustrating even frame-timing on the output when using multiple thresholds for the output buffer.

To guarantee even line widths, the FIFO threshold values may be programmed to depend on the scaling ratio used. For example for a 3/4 scaling ratio (corresponding to a DDA step of 4/3), the programmed values may preferably be 0, 1/4 HresOut, and 1/2 HresOut, although 1/4 HresOut, 1/2 HresOut, and 3/4 HresOut may also be selected, where HresOut represents the horizontal output resolution, that is, the total number of pixels per output line. The starting offset of this series of values depends on the output to input clock ratios, which will be further explained below. The basic concept is illustrated in FIG. 6, where input frame stream 502 is used to generate a scaled down output frame stream 524. As seen in FIG. 6, Line Y is output once the output FIFO occupancy 526 reaches the first threshold value (Threshold 0), Line Y+1 is output once the output FIFO occupancy 526 reaches the second threshold value (Threshold 1), and Line Y+2 is output once the output FIFO occupancy 526 reaches the third threshold value (Threshold 2). The cycle is then repeated for subsequent lines, with Line Y+3 output when the output FIFO occupancy 526 reaches the first threshold value, and so on. As further seen in FIG. 6, the output frame timing signals Hsync 528 and Pixel Valid 530 are also evenly spaced as a result. If the input and output pixel clocks are the same, that is, the input pixel clock domain is the same as the scaled pixel clock domain, the threshold value may be increased by a specified amount to ensure that no bubbles are present in the pixel stream during a scan line.

It should also be noted that that the threshold values indicated above may be highly dependent on the actual clock ratio (input frame/pixel clock domain to output frame/pixel clock domain) since the output clock may be higher or lower than ideal. Accordingly, the calculation of the specific threshold values may depend on the aforementioned clock ratio. For example, if the output to input clock ratio (i.e. output-clock/input-clock) has a value of 'A', where A≤1, then if A<(M/N), the write rate into output buffer is greater than the read rate from the output buffer, which results in a starting offset of 0, with the threshold values forming an arithmetic series starting from 0. If (M/N)<A≤1, the write rate top the output buffer is lower than the read rate from the output buffer, which results in a starting offset of HresOut*(1−(N*A/M)), to prevent bubbles at the buffer output, for the above series.

Figure 4:
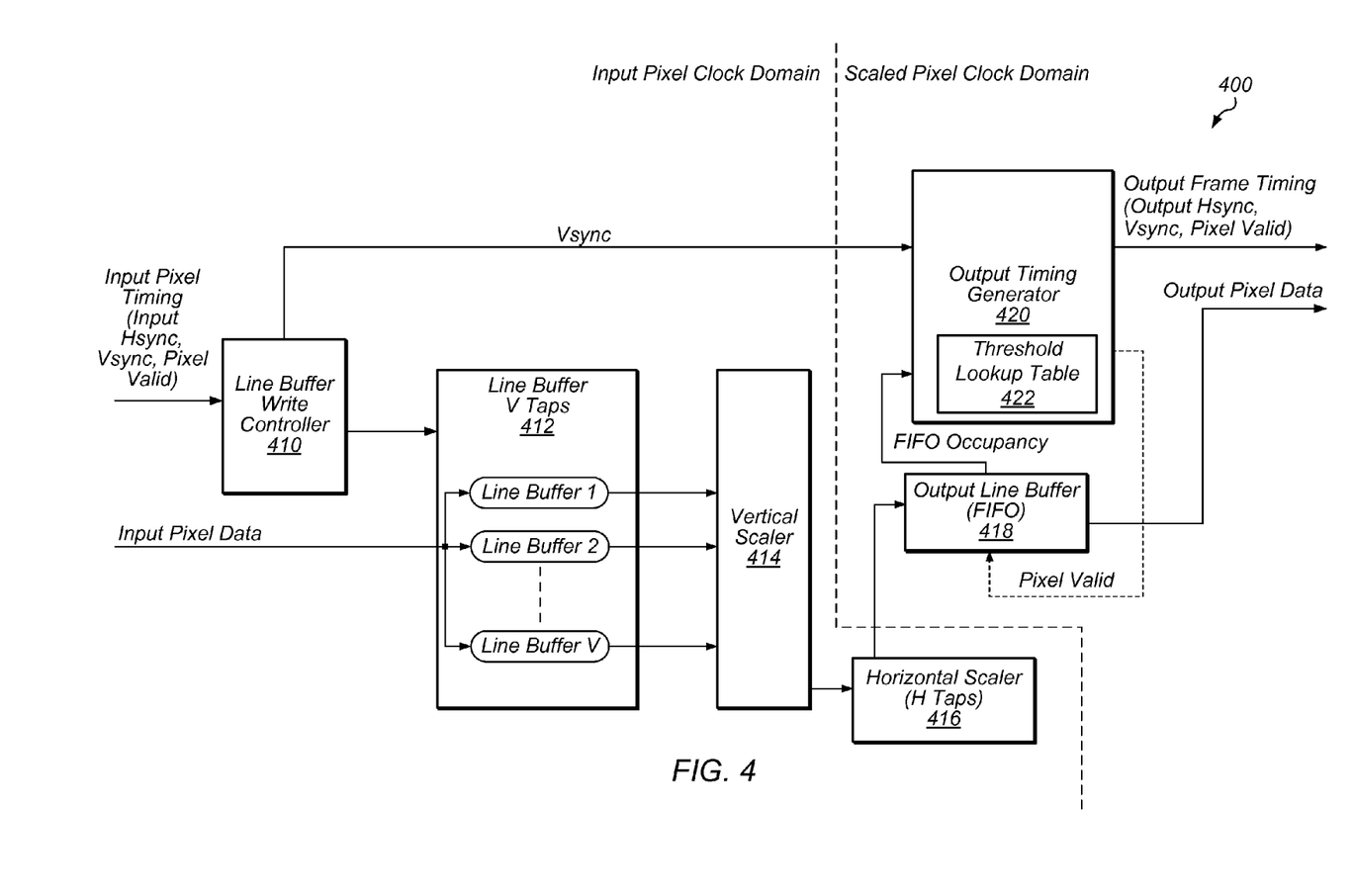
FIG. 4 shows a partial block diagram of one embodiment of a scaler/timing controller for displaying (down)scaled frames/images on a graphics display.

FIG. 4 shows partial block diagram of one embodiment 400 of scaler/timing controller 230 for displaying scaled frames/images on graphics display 160. System 400 is shown for a downscaler configuration, but alternate embodiments may be devised for upscaling, in which case output line buffer 418, i.e. FIFO 418 may be incorporated as an input line buffer instead of an output line buffer. As shown in FIG. 4, a line buffer write controller 410 receives the input pixel timing information and input pixel data, for example from a display controller such as display controller 212 in FIG. 2, and stores the input pixel data into line buffer 412 accordingly. Specifically, line buffer write controller writes the input pixel data to Line buffer 412 when the input pixel valid signal is asserted, and steps to the next line when the input Hsync signal is asserted. Line buffer 412 therefore stores the input lines for the frame, and provides the input lines to vertical scaler 414, which vertically scales (in this case downscales) the input lines to generate corresponding vertically scaled output lines. In the embodiment shown, the vertically scaled output lines are provided to horizontal scaler 416, which generates the scaled output lines and stores the scaled output lines in output line buffer (FIFO) 418.

Write controller 410 receives the Vsync indication when reaching the end of a frame, and provides the Vsync signal to output timing generator 420 in response. Output timing generator 420 generates a corresponding output Vsync signal on the frame boundary when the last line of the frame is output. In addition, output timing generator 420 also provides a valid output Hsync signal on the line boundary each time an output line (output pixel data representative of an output line) is read out of FIFO 418, and the duration of the horizontal front porch time period subsequent to the output line (that has just been read out of FIFO 418) has ended. FIFO 418 may provide an indication of the FIFO occupancy to output timing generator 420, which may compare the received occupancy value to the stored threshold values. In one set of embodiments, output timing generator 420 may include a lookup table 422 that stores the threshold values, and the lookup table is indexed using the value "output-line-number mod M", as previously described. Each time the received occupancy value is indicative of one of a successive number of thresholds (i.e. threshold 0, threshold 1, and threshold 3, as seen in FIG. 6) having been reached, output timing generator 420 generates an output pixel valid signal, and the next line is read out of FIFO 418 responsive to FIFO 418 receiving the output pixel valid signal from output timing generator 420.

In embodiments where the value of integer M is large, a maximum number (T) of buffer thresholds (threshold values) may be supported, where T corresponds to the largest reasonable value of M. The value of T may be determined by various design considerations such as area constraints for example, and may therefore not be as large in one embodiment as it may be in another. In one set of embodiments, a value of sixteen (16) for T may be chosen for basic scaling ratios. Accordingly, the number of threshold values (M) that will be used may be stored, for example in a register that may be included in output timing generator 420. The actual number of threshold values (denoted as NThr) to be used—i.e. the number representative of how many threshold values are used, e.g. '3' in the example provided in FIG. 6—may therefore be assigned as follows:

if( M ≤ T )
    NThr = M
else
    NThr = T.

The threshold for a given line may then be obtained as follows:

if( (Output_Line_Number mod M ) < NThr )
    Threshold (Output_Line_Number mod M) is used
else
    Threshold (NThr − 1) is used.

Referring again to FIG. 6, M=3, therefore NThr=3. Thus, for example, each time a line number is divisible by 3, Threshold 0 is selected as the threshold value against which the FIFO occupancy value is compared. When the result of the modulus operation is 1, the second threshold value, that is, Threshold 1 is selected. For example, for line number 22, "Output_Line$_{13}$ Number mod M" yields "22 mod 3", which equals 1, therefore Threshold 1 (the second threshold value) is selected.

As previously described, the threshold values, e.g. the values of Threshold 0, Threshold 1, and Threshold 2 when M=3, may be determined and programmed according to the scaling ratio and the horizontal output resolution, to reflect the occupancy rate of that particular line to ensure evenly timed lines. It should be noted that even though the various embodiments disclosed herein detail the scaling operation in the context of downscaling, a similar output frame/line timing method may be used in the context of upscaling, with the FIFO buffer (418) situated at the input of the scaler instead of at the output.

Figure 7:
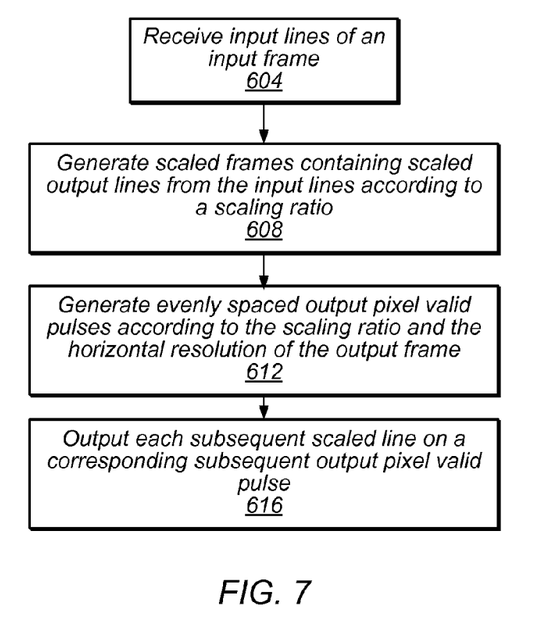
FIG. 7 is a flowchart depicting one embodiment of a method for scaling an input pixel stream for displaying on a graphics display.

According to the embodiments described above, scaled image frames may be retimed according to a process flow as illustrated in the flowchart shown in FIG. 7. First, input lines of an input frame are received (604), and scaled frames containing scaled output lines are generated from the input lines, according to a scaling ratio (608). For timing how the output lines are output, evenly spaced output pixel valid pulses are generated according to the scaling ratio and the horizontal resolution of the output frame (612), and each subsequent scaled line is output on a corresponding subsequent output pixel valid pulse (616).

Figure 8:
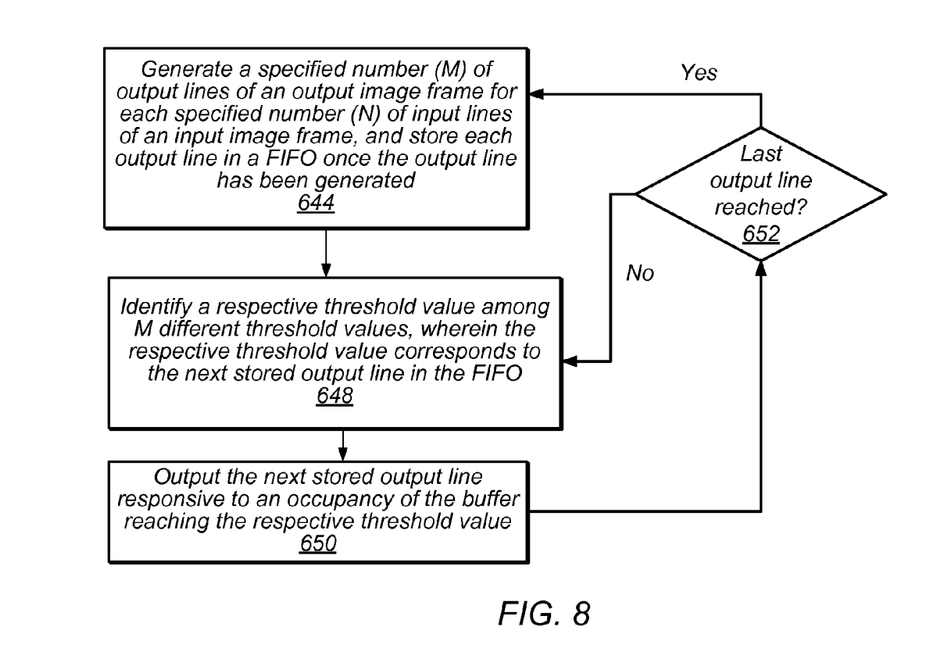
FIG. 8 is a flowchart depicting another embodiment of a method for scaling an input pixel stream for displaying on a graphics display.

Scaled image frames may also be retimed according to the process flow illustrated in the flowchart shown in FIG. 8. According to the process flow in FIG. 8, a specified number (M) of output lines of an output image frame are generate for each specified number (N) of input lines of an input image frame, and each output line is stored in a FIFO once the output line has been generated (644). A threshold value corresponding to the next stored output line in the FIFO is identified among M different threshold values (648), and the next stored output line is output responsive to the occupancy of the buffer reaching the identified threshold value (650). This is performed for all output lines in the FIFO until no more output lines are available in the FIFO (652).

Figure 9:
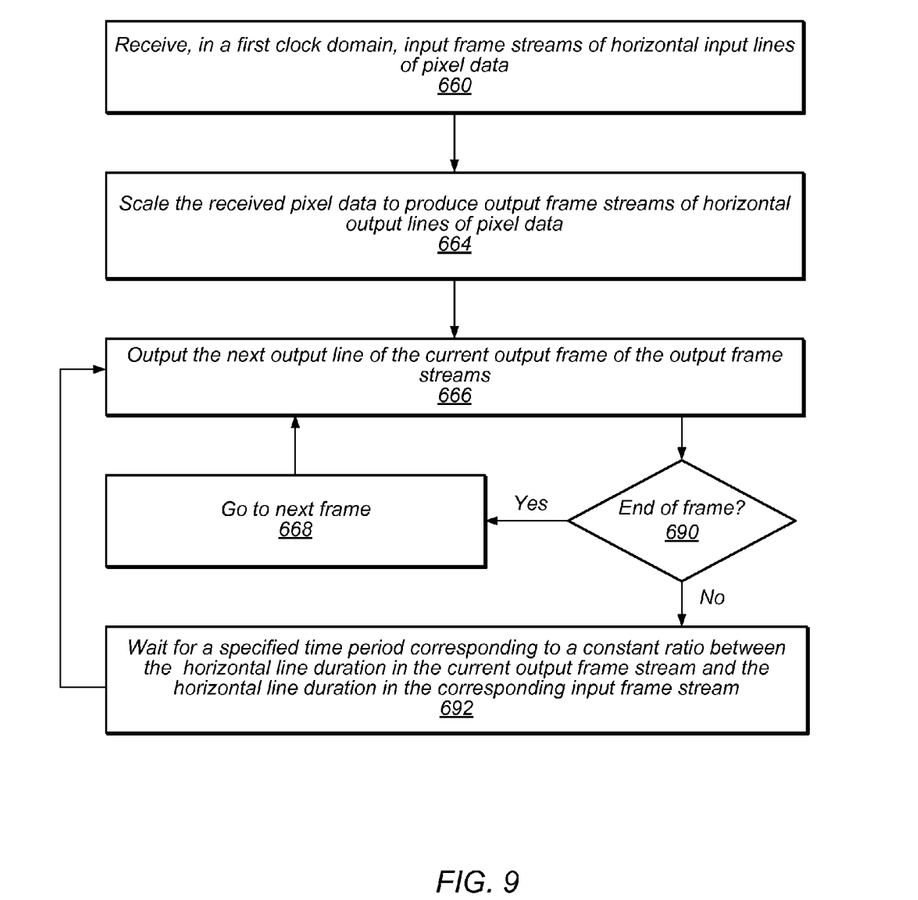
FIG. 9 is a flowchart depicting yet another embodiment of a method for scaling an input pixel stream for displaying on a graphics display.

FIG. 9 shows a flowchart illustrating yet another flow according to which scaled image frames may be timed. As seen in FIG. 9, input frame streams of horizontal input lines of pixel data are received in a first clock domain (660), and the received pixel data is scaled to produce output frame streams of horizontal output lines of pixel data (664). The next output line of the current output frame is output (666), and if the end of the current frame has not been reached ('No' branch at 690), no output lines are output for a specified time period corresponding to a constant ratio between the horizontal line duration in the current output frame stream and the horizontal line duration in the corresponding input frame stream (692). Once the specified time period has expired, the next output line of the current output frame is output (666). This is performed until the end of the frame is reached ('Yes' branch at 690), at which point the process moves on to the next frame (668), for example by issuing a Vsync signal, and the process resumes at 666.

Various embodiments of a scaler block discussed herein may be included in the display pipe of a Timing Controller Chip (TCON). The received display signals may have clearly defined frame timing (like horizontal and vertical blanking), and a scaler would typically cause the frame timing to become uneven (every so often the output frame will have larger than normal horizontal blanks) following a downscaling operation. Therefore, the embodiments of a scaler block disclosed herein provide a correction for this problem, by generating an output pixel stream having equally wide horizontal blanks throughout the frame. Furthermore, while the various embodiments disclosed herein include a Display Port based receiver, other embodiments may similarly be constructed to operate with HDMI or any such display standard. The TCON may be a separate chip that drives the pixels on the display panel.

Numerous variations and modifications will become apparent to those skilled in the art once the above disclosure is fully appreciated. It is intended that the following claims be interpreted to embrace all such variations and modifications.

I claim:

1. A frame timing controller comprising:
a lookup table configured to store a plurality of threshold values; and
a processing unit coupled to the lookup table, and configured to:
for each respective line of a scaled image frame:
determine an index number from:
a relative position of the respective line in the scaled image frame; and
a scaling factor corresponding to a scaling ratio used to obtain the line of the scaled image frame from corresponding lines of an input image frame;
obtain a stored threshold value of the stored plurality of threshold values from the lookup table according to the index number;
wait until occupancy of a buffer configured to store the respective line of the scaled image frame reaches a value corresponding to the stored threshold value; and
once the occupancy of the buffer reaches the value corresponding to the stored threshold value, output the respective line of the scaled image frame from the buffer.

2. The frame timing controller of claim 1, further comprising a register configured to store a first value indicative of how many threshold values are stored in the lookup table;
wherein the scaling factor is commensurate with the first value.

3. The frame timing controller of claim 1, wherein the plurality of threshold values are specified according the scaling ratio.

4. The frame timing controller of claim 3, wherein the plurality of threshold values are further specified according to a horizontal resolution of the scaled image frame.

5. The frame timing controller of claim 1, wherein the processing unit is further configured to generate frame timing signals corresponding to the scaled image frame, and output the respective line of the scaled image frame according to the generated frame timing signals.

6. A graphics system comprising:
a display generation unit configured to:
generate image frames having a resolution of horizontal pixels per vertical pixels (HVP), and wherein each image frame comprises a plurality of lines;
provide the image frames as a data stream for display;
a scaler unit configured to:
receive the data stream;
obtain a scaled data stream by scaling the received data stream according to a scaling ratio, wherein the scaled data stream comprises scaled image frames, and each scaled image frame comprises scaled lines;
generate evenly spaced output pixel valid pulses according to the scaling ratio; and
sequentially output the scaled lines by outputting each subsequent scaled line of the scaled lines on a corresponding subsequent output pixel valid pulse of the output pixel valid pulses;
a buffer configured to store the scaled lines, wherein the scaler unit is configured to sequentially output the scaled lines from the buffer; and
a threshold lookup table configured to store a specified number of threshold values determined according to the scaling ratio, wherein the scaler unit is further configured to generate the output pixel valid pulses according to the stored specified number of threshold values;
wherein the scaler unit is configured to generate a next respective one of the output pixel valid pulses responsive to receiving an indication from the buffer that an occupancy of the buffer has reached a value corresponding to one of the specified number of threshold values.

7. The graphics system of claim 6, further comprising a register configured to store a value representative of the specified number.

8. A method for timing scaled image frames, the method comprising:
receiving, in a first clock domain, input frame streams comprising horizontal input lines of pixel data;
scaling the received pixel data, said scaling producing corresponding output frame streams comprising horizontal output lines of pixel data;
outputting the output frame streams in a second clock domain, comprising:
for each output frame stream of the output frame streams, subsequent to outputting each horizontal output line of the horizontal output lines in the output frame stream, waiting for a same specified time duration before outputting a next horizontal output line of the horizontal output lines in the output frame stream;
the method further comprising:
   storing the horizontal output lines in a buffer, wherein said outputting the output frame streams comprises outputting the horizontal output lines from the buffer;
   storing a specified number of threshold values in a lookup table;
   receiving an occupancy value from the buffer; and
   for each output frame stream of the output frame streams:
   selecting a next stored horizontal output line of the output frame stream from the buffer:
   retrieving from the lookup table a respective threshold value corresponding to the next stored horizontal output line; and
   outputting the next stored horizontal output line from the buffer, responsive to the received occupancy value reaching the respective threshold value.

9. The method of claim 8, wherein said scaling comprises scaling the received pixel data according a scaling ratio of M/N, comprising producing M horizontal output lines per N horizontal input lines;
   wherein the specified time duration corresponds to a ratio of M/N between a horizontal line duration in an input frame stream and a horizontal line duration in an output frame stream, for each input frame stream of the input frame streams and its corresponding output frame stream of the output frame streams.

10. The method of claim 8, wherein said retrieving comprises:
   generating an index value based on a respective position of the next stored horizontal output line within the output frame stream; and
   indexing the lookup table using the index value.

* * * * *